Oct. 22, 1968  J. CASELLAS  3,406,521
HYDRAULIC BOOSTERS

Filed Dec. 30, 1966  3 Sheets-Sheet 1

INVENTOR
J. Casellas

BY  John O'Sheriff,
ATTORNEYS

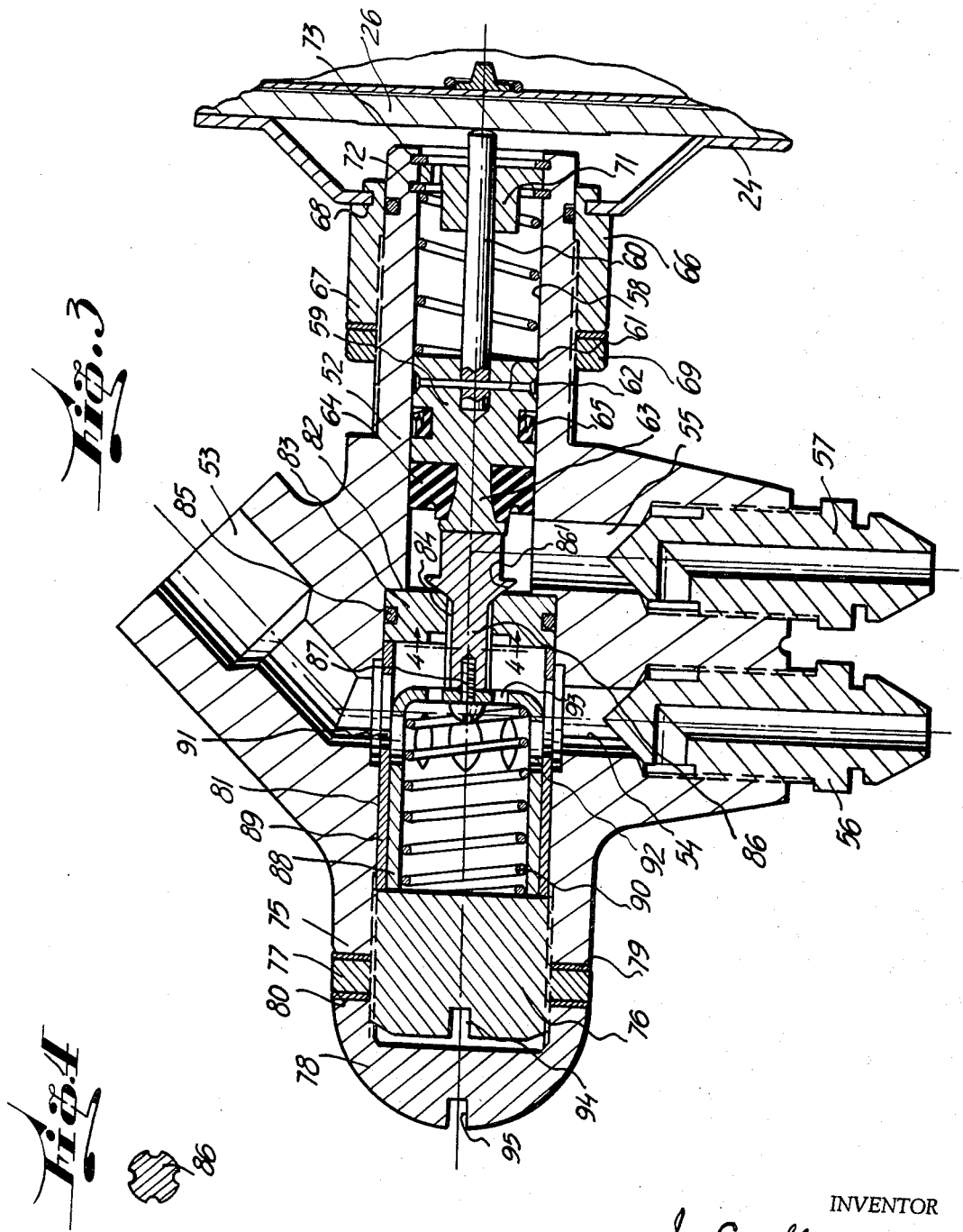

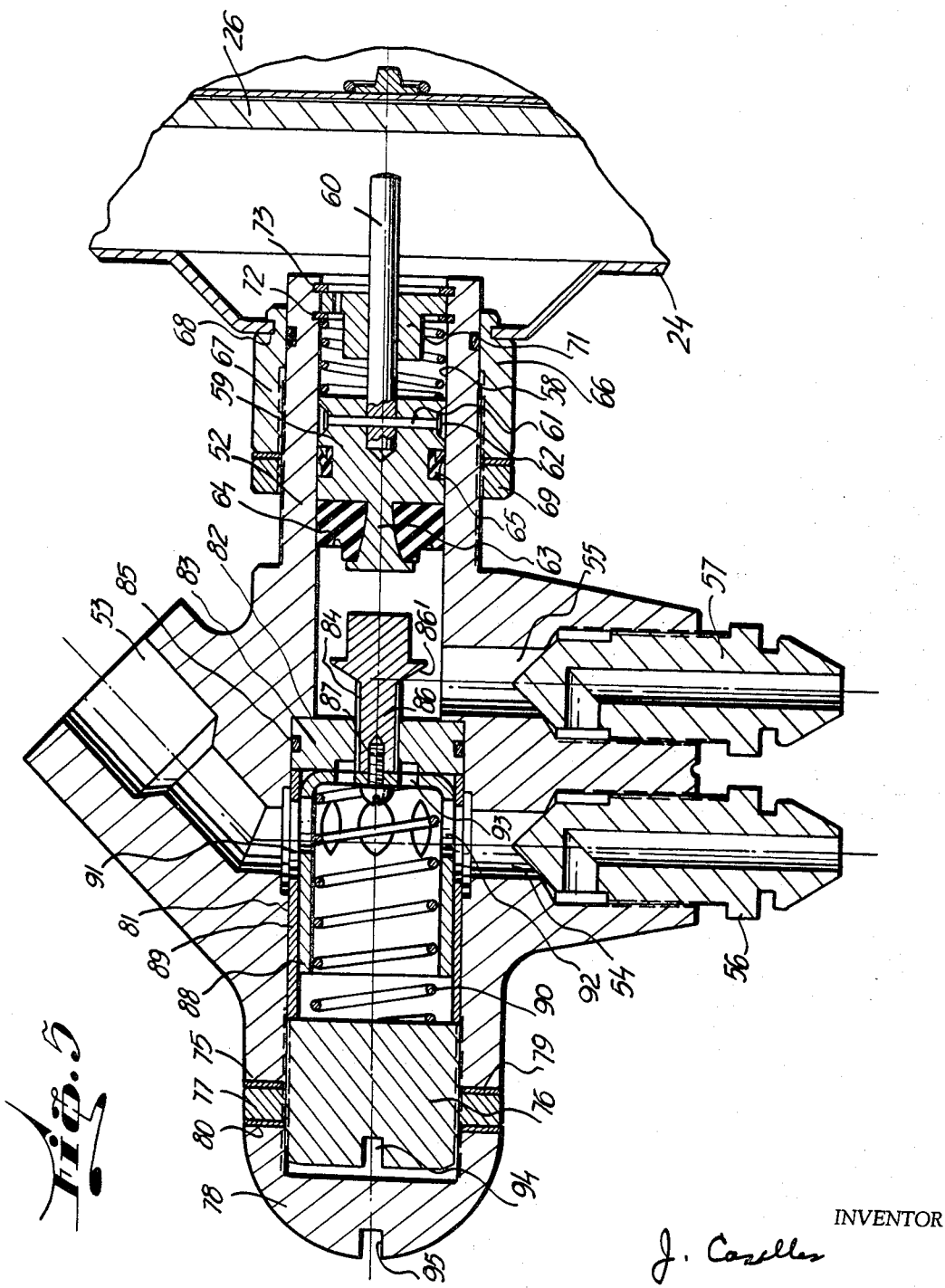

United States Patent Office

3,406,521
Patented Oct. 22, 1968

3,406,521
HYDRAULIC BOOSTERS
Juan Casellas, Mendoza, Argentina, assignor to
Clemente F. Martin, Mendoza, Argentina
Filed Dec. 30, 1966, Ser. No. 606,322
4 Claims. (Cl. 60—54.5)

ABSTRACT OF THE DISCLOSURE

A booster connectable into a hydraulic circuit, for example the braking system of a vehicle, and comprising a pressure actuated servomechanism and a piston connected to act thereupon and cooperate therewith so as to draw part of the fluid from the fluid pressure generating source and thereby produce the actuation of, for example, the brakes of the vehicle with an increased displacement of the means generating the hydraulic pressure.

---

The present invention relates to improvements in boosters for use in hydraulic systems such as in a vehicle brake actuating mechanism and the like.

Various different types of boosters for hydraulic systems are known in the art; basically, their object is to increase the force exerted by the fluid ejected from, for example, the master cylinder of a braking system, whereby an increased braking effect is achieved without requiring an undue effort on the part of the operator. Although, most boosters accomplish this object, it is a known disadvantage that the vehicles that include them, are faced with the inconvenience that actuation of the pedal operated master cylinder produces a nearly instantaneous increase in the hydraulic pressure within the slave cylinders, and this produces a braking effect which is too sudden and unsmooth; this has so far been unavoidable as the fluid pressure increases up to a maximum value with an extremely short displacement of the brake pedal. Due to this, the main brake manufacturers have tended to adopt the "power brake" system which has as a fundamental characteristic, a much smoother braking effect, this being achieved by providing a longer displacement of the brake pedal, which enables the driver to better control the rate of deceleration.

It is known that "power brakes" are an excellent solution for avoiding the disadvantages created by uncontrolled sudden braking, although the system is faced with the inconvenience that it is necessary to design a specific type of device for each make and model of vehicle, as it must be mounted between the brake pedal and the master cylinder, this obviously being an important drawback as in most vehicles the space available for such a connection is virtually nil.

In order to overcome this inconvenience certain improvements have been conceived in connection with boosters for use in a hydraulic system, such as a vehicle brake actuating mechanism and the like and which are basically distinguishable over those boosters known in the art, because of the inclusion of an additional cylinder and piston arrangement adapted to cooperate in the operation of the known type of boosters in order to draw brake fluid from the system and accordingly lengthen the effective braking displacement of the brake pedal.

For certain applications, which are determined by the particular braking system of the vehicle, it is necessary for the additional cylinder and piston arrangement to include other components which can delay the actuation of this additional piston until the fluid pressure has reached a predetermined value. In general terms, these other components comprise additional valve means for producing a hermetic closure between the fluid inlet to said additional cylinder and said piston, until the booster starts operating per se.

By improving the known type of boosters in accordance with the present invention, the following advantages are achieved:

The braking effect of the improved booster is similarly smooth to that of a "power brake" although, equally effective as that of a conventional booster. As the dimensions of the slave cylinders of most automobiles are approximately equal, the same standard type of booster may be used, the only alteration residing in the mounting bracket therefor. When faced with an emergency, during which for one reason or another the vehicle must be towed or when it must unavoidably descend an incline without the motor running, most known boosters do not operate as they lack the vacuum generating arrangement required. In spite of this, the booster of the present invention enables the brake to be applied which, as will be obvious to those skilled in the art, is a substantial improvement over those known mechanisms. In theory, it is generally accepted that an ideal braking system should comprise one master cylinder of large volume, and a further master cylinder of smaller volume, the first one being used to carry the brake pads, in the case of disc-brakes, or the brake shoes in the case of shoe brakes, into contact with the brake drum, while the second master cylinder should be used in order to achieve the braking effect itself. By means of the booster of the present invention, this ideal effect is substantially achieved.

Accordingly, it is the object of the present invention to provide a booster for use in a hydraulic system such as a vehicle brake actuating mechanism and the like, which offers all the previously mentioned advantages.

In order to facilitate the comprehension of the present invention, reference will now be made to two specific embodiments, by way of example, to the accompanying drawings, wherein:

FIG. 3 is a longitudinal cross-section of an alternative embodiment of a portion of the device of the present invention.

FIG. 4 is a cross-section substantially along line 4—4 of FIG. 3.

FIG. 5 is a cross-section similar to that of FIG. 3 but wherein the parts are illustrated in a different operative position.

Figure 1:
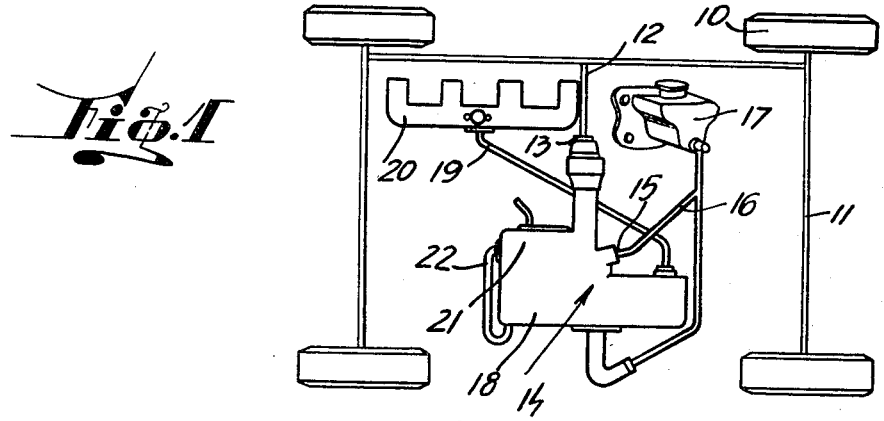
FIG. 1 is a schematic representation of the hydraulic brake system of a vehicle, incorporating the improved booster of the present invention.

Referring in first place to FIG. 1, the wheels 10 of the vehicle have associated slave cylinders (not illustrated) interconnected by pipes 11. These pipes 11 are connected through a pipe 12 to the outlet 13 of a booster 14, the inlet 15 of which (for hydraulic fluid) is connected by means of pipe 16 to master cylinder 17. The booster 14 includes a chamber 18 one end of which is connected by means of a conduit 19 to the inlet manifold 20. The other end of chamber 18 is connected to a valve housing 21 by means of a conduit 22.

Figure 2:
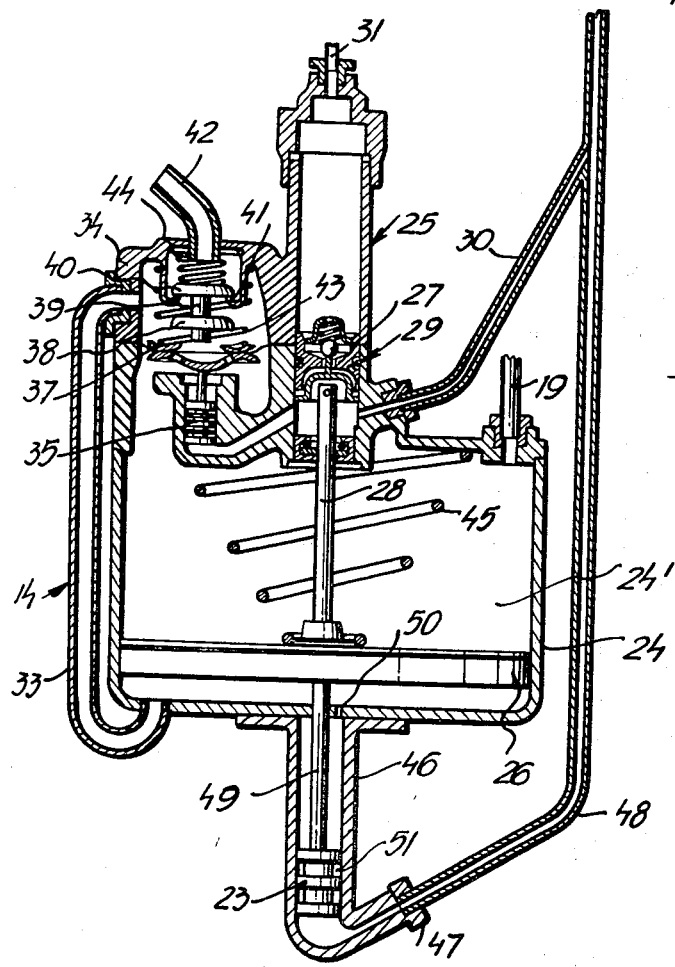
FIG. 2 is a schematic longitudinal cross-section of a hydraulic booster incorporating the improvements of the present invention.

Referring now to FIG. 2, wherein there is illustrated in more detail the booster 14 of FIG. 1, it will be evident those skilled in the art that there is represented a conventional booster of the "Hydro-Vac" type, but whereto a complementary piston 23 together with its associated component parts have been added.

Basically the present invention resides in providing this complementary piston 23 for a conventional booster of the type previously mentioned.

The booster to which the device of the present invention has been added, will not be described in detail although, in order to more clearly indicate the operation of the combination, a brief description thereof will now be made.

The booster illustrated in FIG. 2 comprises a housing 24 defining a chamber 24' and a cylinder 25; a first piston 26 is slidably housed within said chamber 24' while a second piston 27 is slidably housed within cylinder 25. Second piston 27 has a check valve 29 defined therethrough and connected to a shaft 28 integral with first piston 26, whereby check valve 29 is controlled by said first piston 26. Housing 24 is connected by means of conduit 30 to the master cylinder 17 (FIG. 1 only). On the other hand, cylinder 25 is connected by means of port 31 to each one of the slave cylinders of the brakes of the vehicle, through pipes 12 (FIG. 1).

First piston 26 subdivides the chamber 24' in two portions, one of which is connected by means of conduit 19 to a vacuum source such as the inlet manifold 20 (FIG. 1) while the other portion is connected by means of conduit 33 to a valve casing 34 including a cylinder housing a piston 35 responsive to the hydraulic pressure exerted upon second piston 27 by the fluid entering through conduit 30 from master cylinder 17 (FIG. 1); piston 35 is connected to a perforated membrane 36 on which is mounted an annular seat 37 adapted to cooperate with a corresponding circular member 38 capable of producing therewith a hermetic seal and interrupting the flow of air between opposite sides of perforated membrane 36. Previously mentioned conduit 33 ends on the upper side of perforated membrane 36 (as seen in FIG. 2). The chamber portion defined on this side of perforated membrane 36 is connectable to atmosphere through conduit 42 upon the brake pedal being actuated.

Circular member 38 is connected by means of a shaft 39 to a further circular member 40 adapted to cooperate with an annular seat portion 41 and capable of defining therewith a hermetic seal. The actuation of piston 35 produces the displacement of perforated membrane 36 and of annular seat 37 and therefore also of circular member 38 and circular member 40, opening in this way the intercommunication between conduit 42 and conduit 33 and closing the intercommunication between conduit 42 and perforated membrane 36.

Membrane 36, annular seats 37 and 41 and circular members 38 and 40 constitute valve means while piston 35 forms actuating means therefor and which are controlled by said master cylinder.

Before structurally describing the improvement according to the present invention a brief description of the operation of the booster described, will now be given, and on the basis of supposition that conduit 48 is blocked.

When the booster is in the position illustrated, and the motor of the vehicle is running a vacuum is created in the inlet manifold 20 (FIG. 1); as the manifold 20 is connected to conduit 19, if the brake pedal is fully actuated, the master cylinder 17 will send fluid under pressure along conduit 30 and into cylinder 25 behind piston 27 and passing therethrough as the valve defined by the perforation within second piston 27 and valve member 29 is open, whereby the fluid pressure is transmitted to the slave cylinders of the brakes of the wheels and a slight actuation of the brakes is achieved.

On the other hand, the hydraulic pressure generated by the actuation of the brake pedal may be sufficient to make piston 35 move until annular seat 37 enters into contact with circular member 38 and circular member 40 becomes separated from annular seat portion 41. This occurs when a large force is exerted on the brake pedal. In this way conduit 33 will become connected to atmosphere enabling in this way the vacuum created in the inlet manifold to draw first piston 26 towards the other end of its path of movement (opposite to the position illustrated in FIG. 2). In this way valve 29 will become closed and the flow of fluid therethrough will be interrupted, whereby due to the continued actuation of the brake pedal and due to the larger cross-section of piston 27, with respect to that of the piston of the main cylinder, an amplification of the force exerted upon the brake pedal, will be achieved.

It will be obvious to those skilled in the art that by freeing the force exerted upon the brake pedal, the brake fluid will tend to return to a state of equilibrium whereby piston 35 will move towards the position illustrated in FIG. 2 due to the effect of spring 43, the vacuum acting on the lower face of membrane 36 (as seen in FIG. 2) and by the effect of spring 44 and whereby perforated membrane 36, annular seat 37, circular member 38, circular member 40 and annular seat portion 41 will be carried to the position illustrated in the same figure. In this way one and the other faces of first piston 26 are connected to the vacuum generating source and therefore piston 26 will be able to return to the position illustrated, due to the effect of spring 45 and the fluid pressure acting upon piston 27.

The device described, is a typical representation of most hydraulic boosters used in connection with the braking system of a vehicle. This device has the drawback that the displacement of the pedal during actuation thereof and once the booster starts to operate, is extremely small in spite of the large braking effect achieved and therefore it is difficult to "control" the application of the brakes and in various occasions produces the jamming of the wheels.

In order to avoid this drawback and in accordance with the present invention, a piston 23 is provided, slidably mounted within an additional housing or second cylinder 46; the free end 47 of cylinder 46 defines an inlet for the brake fluid and is connectable by means of conduit 48 to the master cylinder 17 (FIG. 1). Furthermore, piston 23 is linked to piston 26 by means of a shaft 49 whereby both pistons are integrally connected.

Between cylinder 46 and housing 24 there is provided a perforation 50 in order to balance the pressures therein.

In connection now with the operation of the improved booster, upon actuating the brake pedal, the booster carries out the steps hereinbefore described, but with the addition that part of the fluid ejected from the master cylinder 17 (FIG. 1) is driven through conduit 48 and forces piston 23 towards housing 24. In this way fluid is "absorbed" by this additional cylinder and piston arrangement and the brake pedal will have a larger displacement during the actuation thereof corresponding to the effective braking of the vehicle. This enables a more controlled deceleration to be achieved.

In practice, in those cases in which the diameter of piston 23 can be smaller than the diameter of piston 27, it is possible to employ a conventional piston such as complementary piston 23; it will be obvious to those skilled in the art that piston 23 will be provided with rings 51 adapted to define a sealing contact between piston 23 and the internal wall of cylinder 46.

In some cases the characteristics of the braking system of the vehicle require the use of an additional piston of a diameter larger than the diameter of piston 27. This requirement may also be based on the fact that variations in the effective displacement of the brake pedal are desirable. In this case, it is necessary to utilize an arrangement such as that illustrated in FIGS. 3 to 5 and wherein valve means are associated with the complementary piston, whereby it is avoided that this complementary piston cooperates with first piston 26 to close valve 29, before sufficient pressure has been built up in the circuit.

To this end delayed operation valve means are provided in said second cylinder and adapted to delay the actuation of said complementary piston until a predetermined fluid pressure is reached in said second cylinder.

This alternative embodiment includes a housing 52 having three ports 53, 54 and 55, port 53 being connectable to the master cylinder 17 (FIG. 1), while ports 54 and 55 are generally blocked by plugs 56 and 57 and are utilizable only in those cases wherein air entrapped in the circuit is to be freed.

Housing 52 defines a cylinder 58 within which a piston 59 is slidably mounted. Piston 59 is integrally connected to a shaft 60 by means of a pin 61. Piston 59, level with pin 61 defines an annular recess 62 so that piston 59 may not damage the surface of cylinder 58 due to the presence of pin 61 which is generally made of hard metal. On the other hand, piston 59 is provided with an outwardly extending portion 63 around which there is mounted an annular sealing member 64 adapted to provide the necessary hermeticity between one and the other faces of piston 59. Piston 59 has an annular recess within which there is positioned a sealing member 65, facing chamber 24, in order to avoid that any instantaneous over-pressure created in the inlet manifold, may pass between the lateral face of piston 59 and cylinder 58 and enter the master cylinder 17 (FIG. 1) through port 53. End 66 of housing 52 includes an externally threaded portion over which there is mounted a threaded bushing 67 including at one end thereof a recess 68, in which the peripheral portion of an opening defined in chamber 24, may be inserted and welded. Adjacent to the other end of bushing 67 there is positioned a nut 69 which is adapted to secure bushing 67 in a predetermined position and avoid the displacement thereof brought about by vibrations to which the vehicle is subjected. Between bushing 67 and nut 69 there is mounted a washer 70, for example of copper, in order to define a hermetic seal therebetween.

In order to axially limit the movement of piston 59 there is positioned within cylinder 58 a bushing 71 adapted to maintain shaft 60 in aligned relationship with the central geometrical axis of cylinder 58. Bushing 71 is retained in position by means of rings 72 and 73. Between bushing 71 and piston 59, a spring 74 is mounted in order that piston 59 upon reaching the end of its path will abut against bushing 71 in an absolutely smooth manner.

End portion 75 of housing 52 defines an opening aligned with cylinder 58. Within this opening there is mounted an externally threaded plug shaped member 76. A nut 77 is screwed onto member 76 and is in side by side contact with end portion 75, there being between end portion 75 and nut 77 a sealing ring 79. Over member 76 and so as to close the open end of housing 52 there is provided a cap 78 screwed onto member 76 and spaced from nut 77 by a further sealing ring 80. Both member 76 and cap 78 have corresponding recesses 94 and 95 adapted to receive a withdrawing tool. In this way it is possible to vary the position of member 76 or else if necessary to extract all the component elements housed within cylinder 58.

Cylinder 58 includes a portion 81 of larger diameter, and which therefore defines a step 82 with the portion of the cylinder of smaller diameter. An annular member 83 rests against step 82 and includes a perforation 84, one end of which has been angled off in order to provide a valve seat, for the purpose to be described further on. Annular member 83 has a peripheral recess within which is housed a resilient ring 85 in sealing contact with cylinder 58.

A value shaft 86 extends through perforation 84, one end of this valve shaft 86 being adapted to enter into abutting contact with outwardly extending portion 63. Valve shaft 86 has defined thereon an inclined portion 86′ which together with perforation 84 defines the aforementioned delayed operation valve means. The other end of valve shaft 86 is secured by means of a screw 87 to a hollow perforated member 88 slidably mounted within a cylinder liner 89 placed within second cylinder 58. Hollow member 88 houses a spring 90 which tends to separate it from plug shaped member 76, although it is to be pointed out that the resilient force of spring 90 should be substantially smaller than the resilient force of the spring 45 (FIG. 2) for the correct operation of the device.

Cylinder liner 89 includes perforations 91 so that ports 53, 54 and 55 are in permanent communication with the interior of hollow perforated member 88, to which end previously mentioned hollow perforated member 88 has perforations 92 in its lateral wall and perforations 93 defined in the bottom wall thereof.

As has been pointed out above, the elastic force of spring 90 is smaller than the elastic force of spring 45, whereby valve shaft 86 is normally seated against annular member 83.

The operation of the device illustrated in FIGS. 3, 4 and 5 will now be described, in combination with the known type of booster illustrated in part of FIG. 1.

With the different component parts in the position illustrated in FIG. 3, and upon actuating the brake pedal, the master cylinder 17 (FIG. 1) will force fluid under pressure into inlet 15 (FIG. 1), as well as towards port 53 of the device illustrated in FIGS. 3 and 5. As annular member 83 and the inclined portion 86′ of valve shaft 86 define a hermetic barrier against the passage of fluid, no pressure except that acting on inclined portion 86′ will be exerted upon piston 59 until the booster starts to operate or until the acting fluid pressure exceeds a predetermined value, whereupon annular member 83 and the inclined portion 86′ of valve shaft 86 (FIG. 5) will become separated allowing in this way the fluid to pass therebetween and accordingly exert a driving effect upon piston 59, the movement of which will be transmitted through shaft 60 to first piston 26 which will colaborate in this way in the closing of valve 29 in piston 27, help to apply the brakes and "draw" liquid from the master cylinder. In this way a lengthened displacement of the brake pedal is achieved.

Upon freeing the force exerted upon the brake pedal and therefore upon piston 27, the fluid pressure will tend to return to its normal state of equilibrium and therefore the component parts will be carried to the position illustrated in FIG. 2 driving in this way shaft 60 and piston 59 towards the position illustrated in FIG. 3 and consequently closing the valve means constituted by annular member 83 and the inclined portion 86′ of valve shaft 86 so as to position the device ready for a further actuation.

Although two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A booster for use in a hydraulic system such as a vehicle brake actuating mechanism and the like, comprising a housing defining a chamber and a cylinder, a first piston slidably housed within said chamber and a second piston, mechanically interrelated with said first piston and slidably housed within said cylinder; a conduit connecting opposite ends of said chamber, on one and the other sides of said first piston; said cylinder being adapted to be connected by one end to a master cylinder and by its other end to at least one slave cylinder; valve means connecting one end of said chamber to atmosphere, these valve means being also connected into the connection between both ends of said chambers; actuating means for said valve means, said actuating means being controlled by said master cylinder; and a check valve defined in said second piston and controlled by said first piston, the improvement residing in the provision of an additional housing defining a second cylinder connectable by one end to said master cylinder; and a complementary piston slidably housed in said second cylinder and adapted to enter into pushing relationship with said first piston.

2. The booster of claim 1, wherein said complementary piston is connected to said first piston.

3. A booster for use in a hydraulic system such as a vehicle brake actuating mechanism and the like, comprising a housing defining a chamber and a cylinder, a first piston slidably housed within said chamber and a second piston mechanically interrelated with said first piston and slidably housed within said cylinder; a conduit connecting opposite ends of said chamber, on one and the other sides of said first piston; said cylinder being adapted to be connected by one end to a master cylinder and by its other end to at least one slave cylinder; valve means connecting one end of said chamber to atmosphere, these valve means being also connected into the connection between both ends of said chamber; actuating means for said valve means, said actuating means being controlled by said master cylinder; and a check valve defined in said second piston and controlled by said first piston, the improvement residing in the provision of an additional housing defining a second cylinder connectable by one end to said master cylinder; a complementary piston slidably housed in said second cylinder and adapted to enter into pushing relationship with said first piston, and delayed operation valve means in said second cylinder and adapted to delay the actuation of said complementary piston until a predetermined fluid pressure is reached therein.

4. The booster of claim 3, wherein said complementary piston is adapted to abut against said first piston.

References Cited

UNITED STATES PATENTS

| | | | |
|---|---|---|---|
| 2,470,748 | 5/1949 | Thomas et al. | 60—54.5 |
| 3,130,551 | 4/1964 | Chouings | 60—54.5 |

MARTIN P. SCHWADRON, *Primary Examiner.*

ROBERT R. BUNEVICH, *Assistant Examiner.*